United States Patent
Cossa et al.

(10) Patent No.: US 12,394,260 B2
(45) Date of Patent: Aug. 19, 2025

(54) SIGNAL EXPECTED RANGE FOR A VEHICLE

(71) Applicant: Robert Bosch GmbH, Stuttgart (DE)

(72) Inventors: Adrien Cossa, Stuttgart (DE); Sebastian Gropper, Donzdorf (DE); Klaus Merkle, Oberriexingen (DE); Victor Lemmel, Sersheim (DE); Andres Murube Lindahl, Stuttgart (DE); Matheus Duempelmann, Stuttgart (DE); Timo Basile, Forst (DE); Tushar Parulekar, Farmington Hills, MI (US); Sanjiv Lancy, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 169 days.

(21) Appl. No.: 18/480,168

(22) Filed: Oct. 3, 2023

(65) Prior Publication Data

US 2025/0111715 A1 Apr. 3, 2025

(51) Int. Cl.
*G07C 5/08* (2006.01)
*B60L 58/30* (2019.01)
(Continued)

(52) U.S. Cl.
CPC ............ *G07C 5/0816* (2013.01); *B60L 58/30* (2019.02); *F02D 41/22* (2013.01); *F02M 26/49* (2016.02);
(Continued)

(58) Field of Classification Search
CPC .... G07C 5/0816; G07C 5/0808; G07C 5/085; G07C 5/10; B60L 58/30; F02D 41/22;
(Continued)

(56) References Cited

U.S. PATENT DOCUMENTS 9,933,338 B2 4/2018 Noda et al.
10,353,005 B2 7/2019 Williams et al.
(Continued)

FOREIGN PATENT DOCUMENTS

CN 110705187 A 1/2020
CN 111666982 A 9/2020
(Continued)

OTHER PUBLICATIONS

Dineva et al., "Fault Diagnosis of Rotating Electrical Machines Using Multi-Label Classification," Applied Sciences, 2019, vol. 9, 18 pages.
(Continued)

*Primary Examiner* — Michael V Kerrigan
(74) *Attorney, Agent, or Firm* — Michael Best & Friedrich LLP

(57) ABSTRACT

A system and method for indicating failure of a vehicle component of a vehicle by determining anomalies for a vehicle signal of a vehicle is provided that includes a model that is trained with training data resulting in a trained artificial intelligence model. The trained model is executed by an electronic processor configured to: receive a plurality of input signals correlated with the vehicle signal; analyze the input signals; determine a predicted vehicle signal from the input signals; determine a tolerance band from the input signals; and when the model is valid, generate a model valid signal. A comparison device is configured to: receive the predicted vehicle signal, the tolerance band, and the model valid signal; receive the measured vehicle signal; and determine whether the measured vehicle signal is an anomaly based on the measured vehicle signal, the predicted vehicle signal, the tolerance band, and the model valid signal.

20 Claims, 10 Drawing Sheets

(51) Int. Cl.
  *F02D 41/22* (2006.01)
  *F02M 26/49* (2016.01)
  *G07C 5/10* (2006.01)
(52) U.S. Cl.
  CPC ........... *G07C 5/0808* (2013.01); *G07C 5/085* (2013.01); *G07C 5/10* (2013.01); *F02D 2200/501* (2013.01); *F02D 2200/703* (2013.01)
(58) Field of Classification Search
  CPC ......... F02D 2200/501; F02D 2200/703; F02D 2041/0075; F02D 29/02; F02D 41/0072; F02D 41/1405; F02D 41/222; F02M 26/49
  See application file for complete search history.

(56) References Cited

U.S. PATENT DOCUMENTS

| | | | |
|---|---|---|---|
| 11,236,694 | B2 | 2/2022 | Lee et al. |
| 11,468,274 | B2 | 10/2022 | Krompaß et al. |
| 2020/0387148 | A1* | 12/2020 | Ghosh ................ G06F 17/18 |

FOREIGN PATENT DOCUMENTS

| | | |
|---|---|---|
| KR | 102215690 B1 | 2/2021 |
| WO | 2015158198 A1 | 10/2015 |
| WO | 2021239716 A | 12/2021 |

OTHER PUBLICATIONS

Holbert et al., "Redundant Sensor Validation by Using Fuzzy Logic," Nuclear Science and Engineering, 1994, vol. 118, pp. 54-64.
Schockaert et al., "A Causal-based Framework for Multimodal Multivariate Time Series Validation Enhanced by Unsupervised Deep Learning as an Enabler for Industry 4.0," arXiv preprint arXiv:2008.02171, Aug. 2020, 7 pages.
Serdio et al., "Fuzzy Fault Isolation Using Gradient Information and Quality Criteria from System Identification Models," Information Sciences, 2015, vol. 316, pp. 18-39.
Serdio et al., "Improved Fault Detection Employing Hybrid Memetic Fuzzy Modeling and Adaptive Filters," Applied Soft Computing, 2017, vol. 51, pp. 60-82.

* cited by examiner

SIGNAL EXPECTED RANGE FOR A VEHICLE

BACKGROUND

Arrangements, examples, and aspects described herein relate to, among other things, a system and method for determining whether a vehicle signal is in an expected range using artificial intelligence.

The detection of anomalies in measurements is a common problem in the field of engine calibration. A one to one comparison of measurements is not applicable as operating conditions continuously change. Such conditions include external or ambient temperature, altitude, driving style, and other vehicle properties.

Current approaches include manual inspection of vehicle data, which is prone to false positive results. A false positive result occurs when an evaluation returns a positive result that no anomaly was detected, even though an anomaly occurred. Another effort includes rules based algorithms that are also prone to false negative results. A false negative result occurs when an evaluation returns a negative result that an anomaly was detected, even though no anomaly occurred.

SUMMARY

The arrangement is directed to the detection of failure of a vehicle component of a vehicle by determining anomalies in measurements using a trained artificial intelligence model.

In one arrangement is directed to a system for indicating a failure of a vehicle component by determining anomalies for a measured vehicle signal of a vehicle. The system comprises: a memory that stores a trained artificial intelligence model and an electronic processor coupled to the memory that executes the trained artificial intelligence model. The electronic processor is configured to: retrieve a plurality of input signals that are correlated with the measured vehicle signal; determine a predicted vehicle signal from the plurality of input signals; determine a tolerance band from the plurality of input signals; determine whether the model is valid, and when the model is valid generate a model valid signal. The system includes a comparison device that is configured to: retrieve the predicted vehicle signal, the tolerance band, and the model valid signal, retrieve the measured vehicle signal, and determine whether the measured vehicle signal is an anomaly based on the measured vehicle signal, the predicted vehicle signal, the tolerance band, and the model valid signal. The system includes an aggregator coupled to the comparison device that is configured to: count and store times and occurrences of the anomalies; and indicate a failure of the vehicle component depending on a number of the anomalies over a period of time.

In another arrangement, a method for indicating failure of a vehicle component by determining anomalies for a measured vehicle signal of a vehicle includes executing a trained artificial intelligence model with an electronic processor. The electronic processor is configured for: retrieving a plurality of input signals that are correlated with the measured vehicle signal; determining a predicted vehicle signal from the plurality of input signals; determining a tolerance band from the plurality of input signals; determining whether the model is valid, when the model is valid generating a model valid signal; retrieving the measured vehicle signal; determining whether the measured vehicle signal is an anomaly based on the measured vehicle signal, the predicted vehicle signal, the tolerance band, and the model valid signal; counting and storing times and occurrences of the anomalies; and indicating a failure of the vehicle component depending on a number of anomalies over a period of time.

One arrangement is directed to a method for indicating failure of a vehicle component of a vehicle. The method comprises: retrieving a plurality of input signals that are correlated with a vehicle signal; determining a predicted vehicle signal from the plurality of input signals using a trained artificial intelligence model; determining a tolerance band from the plurality of input signals; determining whether the model is valid, when the model is valid generating a model valid signal; retrieving a measured vehicle signal; determining whether the measured vehicle signal is an anomaly based on the measured vehicle signal, the predicted vehicle signal, the tolerance band, and the model valid signal; counting a number of and storing times for occurrence of the anomalies, and indicating a failure of a vehicle component depending on the number of anomalies over a period of time.

DETAILED DESCRIPTION

Figure 1:
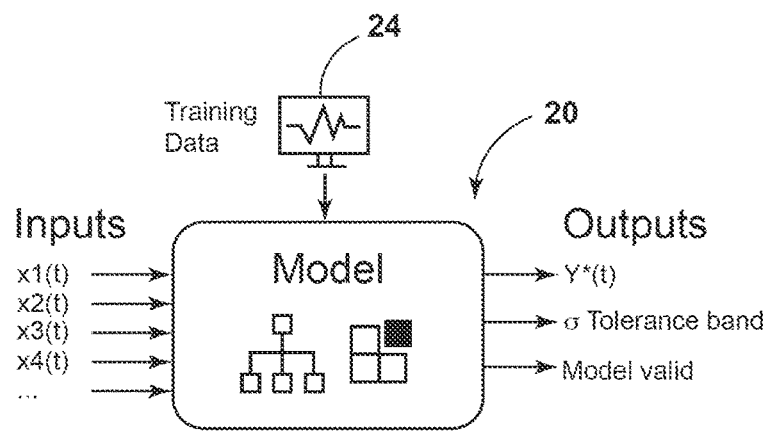
FIG. 1 is a block illustration of a model that receives inputs and provides a predicted vehicle signal, a tolerance band, and a model valid signal according to some aspects.

Before any arrangements, examples, aspects, or features are explained in detail, it is to be understood that those arrangements, examples, aspects and features are not limited in their application to the details of construction and the arrangement of components set forth in the following description or illustrated in the following drawings. Other arrangements, examples, aspects, and features are possible and are capable of being practiced or of being carried out in various ways.

Also, it is to be understood that the phraseology and terminology used herein is for the purpose of description and should not be regarded as limiting. The terms "mounted," "connected" and "coupled" are used broadly and encompass both direct and indirect mounting, connecting, and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized in various implementations. Aspects, features, and instances may include hardware, software, and electronic components or modules that, for purposes of discussion, may be illustrated and described as if the majority of the components were implemented in hardware. However, one of ordinary skill in the art, and based on a reading of this detailed description, would recognize that, in at least one instance, the electronic based aspects of the invention may be implemented in software (for example, stored on non-transitory computer-readable medium) executable by one or more electronic processors. As a consequence, it should be noted that a plurality of hardware and software based devices, as well as a plurality of different structural components may be utilized to implement the invention. For example, "operating units" and "controllers" described in the specification can include one or more electronic processors, one or more memory modules including a non-transitory computer-readable medium, one or more input/output interfaces, and various connections (for example, a system bus) connecting the components. It should be understood that although certain drawings illustrate hardware and software located within particular devices, these depictions are for illustrative purposes only. In some instances, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

For ease of description, some or all of the example systems presented herein are illustrated with a single exemplar of each of its component parts. Some examples may not describe or illustrate all components of the systems. Other instances may include more or fewer of each of the illustrated components, may combine some components, or may include additional or alternative components.

FIG. 1 illustrates a block illustration of a trained artificial intelligence (AI) model 20 that receives multiple vehicle inputs x1, x2, x3, x4, x . . . over time (t). The trained AI model 20 provides a predicted vehicle signal Y*(t), a tolerance band ($\sigma$), and a domain validity signal corresponding to conditions where the trained AI model is designed to operate.

The artificial intelligence model 20 shown in FIG. 1 is trained with training data 24 using a model training algorithm. The model training occurs as follows. All available data is identified and an assessment of the relevance, and quality of the data is made. The data is separated between training data 24 and testing datasets. An iterative model training occurs where model structure and hyperparameters are selected. The trained model quality is evaluated and validated based on relevant metrics. The iterative process results in many candidate models. Only one model is selected for use. Model selection is based on a quality/complexity tradeoff. Analysis of model performance with test data is performed. The selected model is integrated into the artificial intelligence model 20 and formatted as a digital file.

In operation, the trained AI model 20, which is a trained algorithm in some arrangements, receives the various inputs x1(t)-x4(t) to determine a value for the predicted vehicle signal, along with a tolerance band value $\sigma$, and a valid signal indicating that the output of the trained AI model 20 is useful. The domain valid signal corresponds to conditions where the trained AI model is designed to operate.

Figure 2:
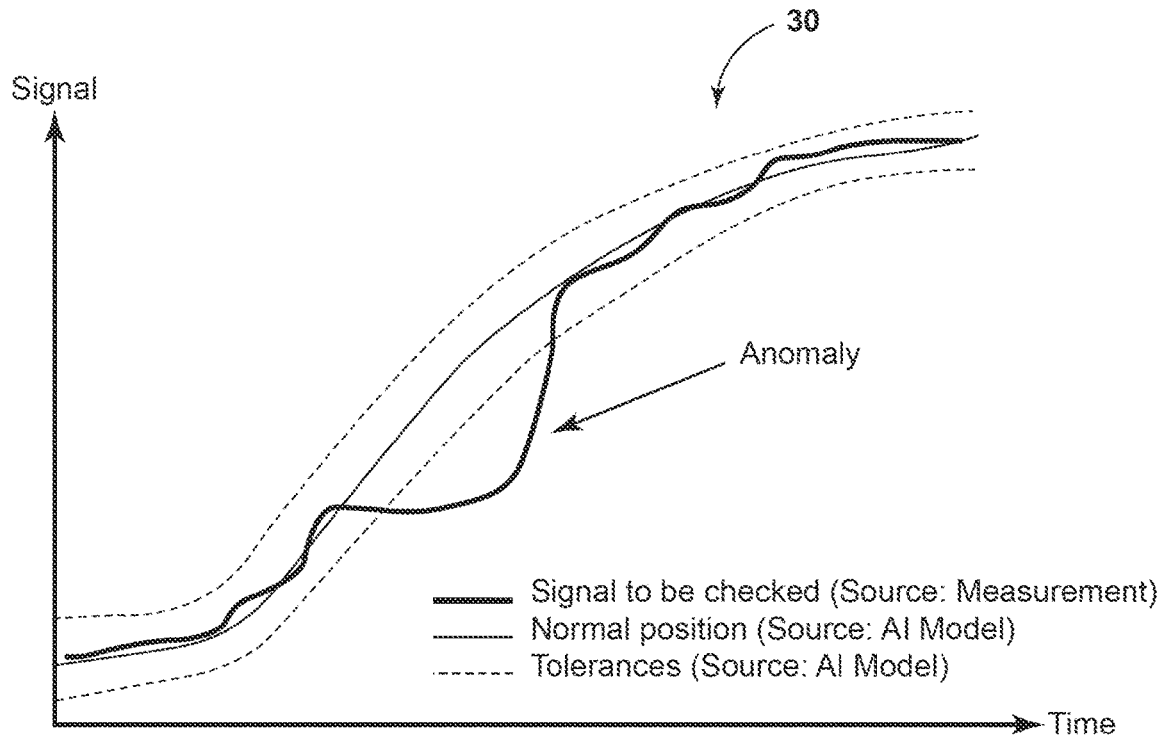
FIG. 2 illustrates a graph of a predicted vehicle signal for the model of FIG. 1, according to some aspects.

FIG. 2 shows an example of graph 30 of a measured signal to be stored and checked over time. An anomaly is determined wherein the measured signal is outside of the tolerance band or range represented by respective broken lines. A normal predicted signal value is shown by the line that remains between/within the tolerance band or tolerance range defined by the broken lines.

In actual operation, the trained artificial intelligence model 20 is configured to: receive a plurality of input signals x1-x4 that are correlated with the vehicle signal and the plurality of input signals are analyzed. The analysis by the trained AI model 20 determines a predicted vehicle signal Y*(t) from the plurality of input signals; determines a tolerance band value $\sigma$ from the plurality of input signals; and determines whether the model is valid and generates a model valid signal. The predicted vehicle signal Y*(t) is shown changing over time in response to the inputs x1(t)-x4(t) as illustrated in FIG. 2. The predicted vehicle signal and the tolerance band also change over time as shown in FIG. 2. An indication (true/false) statement of when the model is valid, is provided by the trained AI model 20 generating the model valid signal.

Figure 2A:
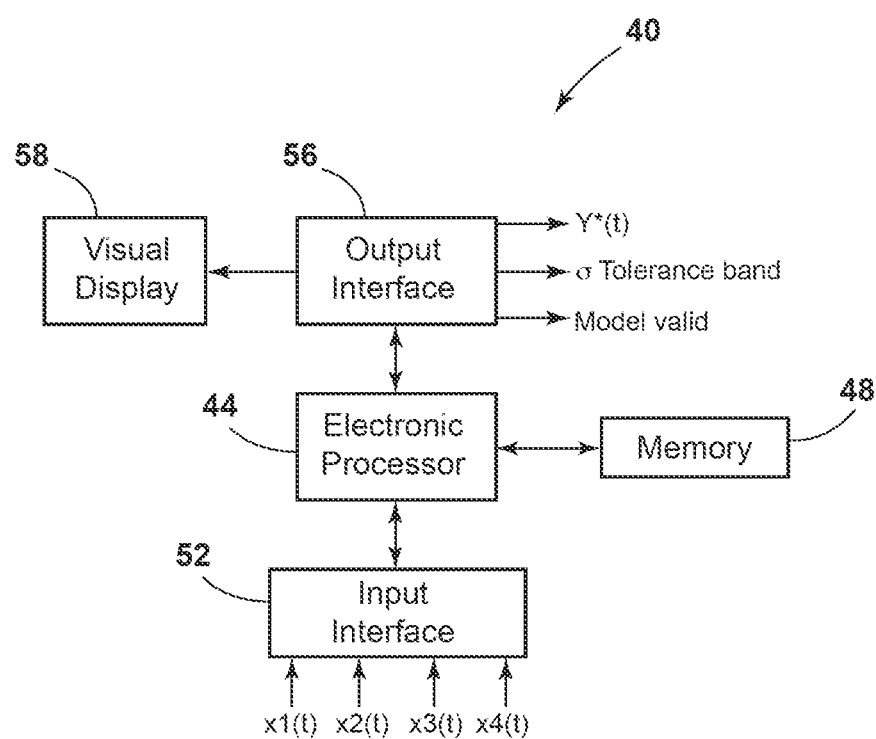
FIG. 2A is a block illustration of an electronic operating device 40 for the trained AI model 20 of FIG. 1.

FIG. 2A shows an electronic operating device 40 for the trained AI model 20 of FIG. 1 that includes an electronic processor 44 (for example, a microprocessor, application specific integrated circuit, etc.), a memory 48, and an input interface 52, along with an output interface 56 and a visual display 58. The memory 48 that is coupled to the electronic processor 44 stores the trained artificial intelligence model. The memory may be made up of one or more non-transitory computer-readable media and includes at least a program storage area and a data storage area. The program storage area and the data storage area can include combinations of different types Of memory, such as read-only memory ("ROM"), random access memory ("RAM"), electrically erasable programmable read-only memory ("EEPROM"), flash memory, or other suitable memory devices. The electronic processor 44 is coupled to the memory 48, the input interface 52, and the output interface 56. The electronic processor 44 is configured for sending and receiving information (for example, from the memory 48 and/or the input interface 52) and processing the information by executing the trained AI model 20 via one or more software instructions or modules. The electronic processor 44 is also capable of storing processed information in the memory 48, or another non-transitory computer readable medium. The output interface 56 provides information or results for further evaluation by another device.

The portable electronic operating device 40 shown in FIG. 2A represents a portable electronic operating device 40 in one arrangement. The portable electronic operating device 40 includes a connector for connection to a vehicle port to read stored vehicle data from a separate vehicle memory or to read stored time sequenced vehicle data from the vehicle memory.

Figure 3:
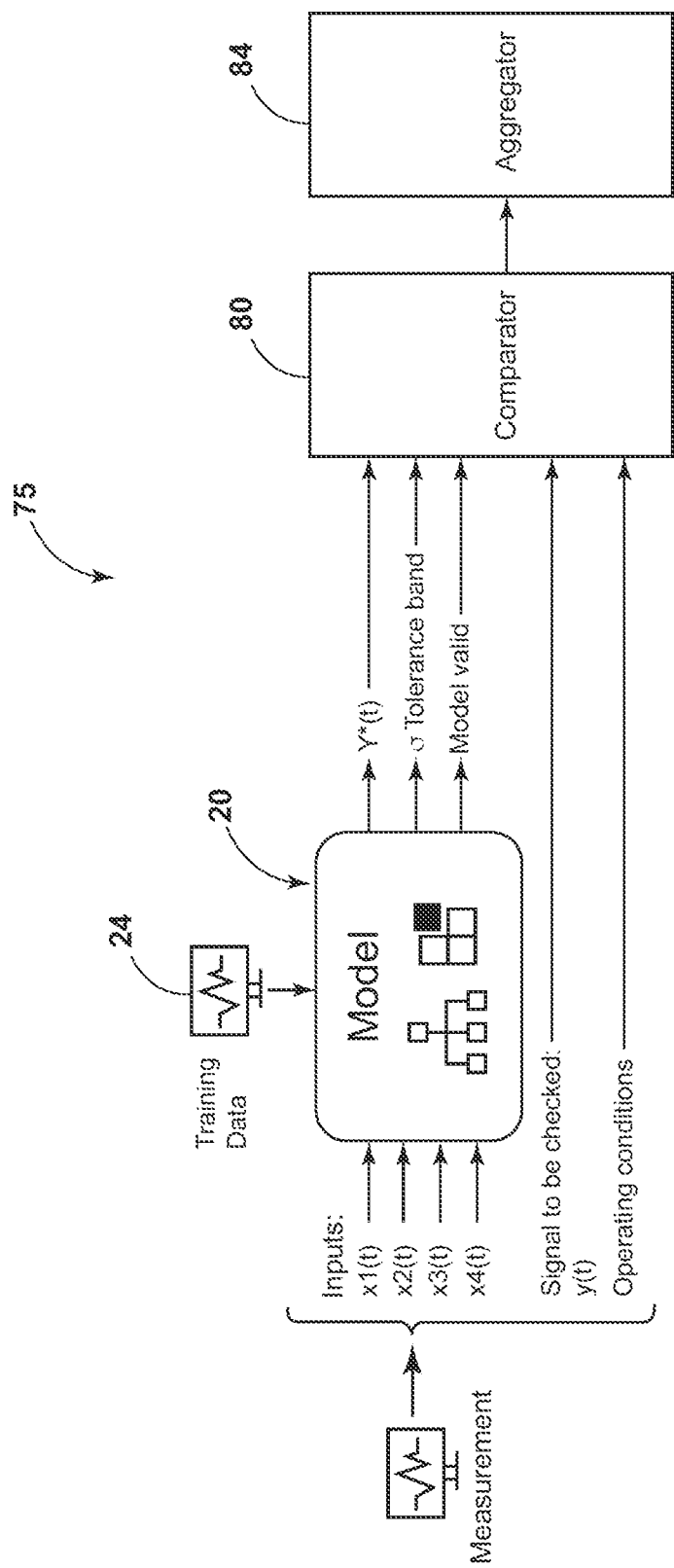
FIG. 3 is a block illustration of a system including the model of FIG. 1 connected to a comparator to evaluate an anomaly for a vehicle signal.

FIG. 3 shows a system 75 including the trained AI model 20 of FIG. 1 connected to a comparator or comparison device 80 to evaluate an anomaly for a vehicle signal. In FIG. 3, the comparison device 80 is configured to receive the predicted vehicle signal, the tolerance band, and the model valid signal generated by the trained AI model 20. Further, the comparison device 80 receives the measured vehicle signal stored in the memory of a vehicle; and receives operating conditions of the vehicle. After receiving the received signals and conditions, the comparison device 80 determines whether the measured vehicle signal is an anomaly based on the measured vehicle signal, the predicted vehicle signal Y*(t), the tolerance band value σ, and whether the model is valid. In one arrangement, the anomalies are aggregated by an aggregator 84 that counts and stores the times and the occurrences or number of the anomalies. In one arrangement, the aggregated anomalies are further processed by the aggregator 84 to determine a vehicle component, system, or sensor failure/error for display. Vehicle component failures include sensor failures/faults or system failures/faults.

Figure 4:
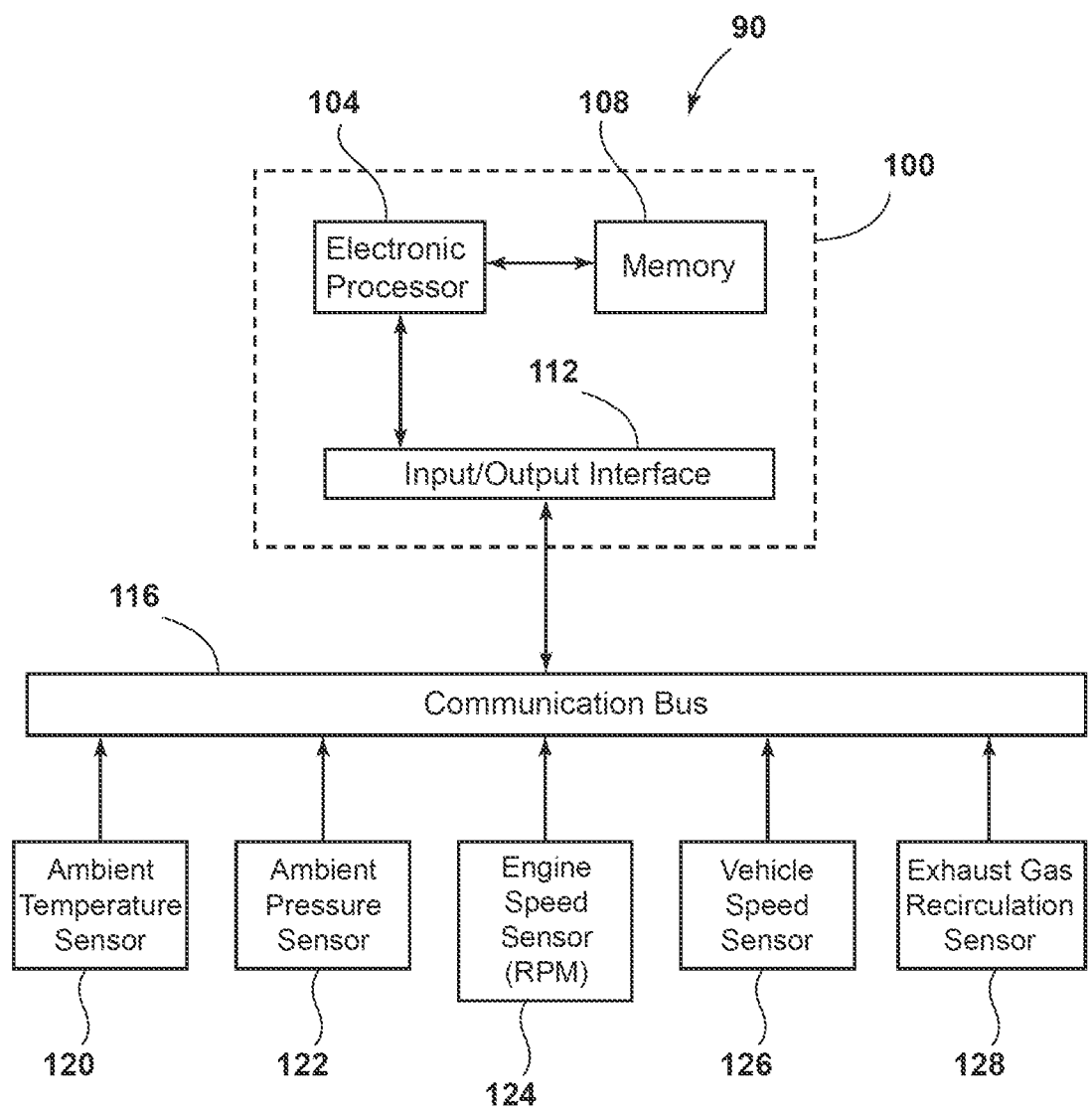
FIG. 4 is a block diagram of a vehicle electronic operating unit and sensors connected thereto via a bus to provide information related to exhaust gas recirculation, according to some aspects.

FIG. 4 shows a specific example of a vehicle system 90 for storing and providing information including a measured vehicle signal of a vehicle. The vehicle system 90 includes a vehicle electronic operating unit 100 that includes an electronic processor 104 (for example, a microprocessor, application specific integrated circuit, etc.), a memory 108, and an input/output interface 112. The memory 108 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 104 is coupled to the memory 108 and the input/output interface 112. The electronic processor 104 is configured for sending and receiving information (for example, from the memory 108 and/or the input/output interface 112). The electronic processor 104 is also capable of storing processed information in the memory 108, or another non-transitory computer readable medium. The software can include firmware, one or more applications, program data, filters, rules, one or more program modules, and other executable instructions.

The electronic processor 44 is configured to retrieve from the memory 48 and execute, among other things, software including a trained AI algorithm of the trained AI model 20 for performing methods as described herein. The input/output interface 52 retrieves information originally from the vehicle system 90 external to the electronic operating unit 40. It should be understood that the vehicle electronic operating unit 100 may include additional components than those illustrated in FIG. 4 and in various configurations. For example, in some examples, the vehicle electronic operating unit 100 includes multiple electronic processors 104, multiple memories 108, multiple input/output interfaces 112, or a combination thereof.

In some instances, the communication bus 116 shown in FIG. 4 is a controller area network (CAN) bus. In some instances, the communication bus 116 is an automotive Ethernet, a FlexRay™ communications bus, or another suitable bus. In alternative instances, some or all of the components of the vehicle may be communicatively coupled using suitable wireless modalities (for example, Bluetooth™ or near field communication connections).

FIG. 4 shows sensors that measure one or more attributes of a vehicle/vehicle engine and the environment around the vehicle and communicate information regarding those attributes to the other components of the vehicle using, for example, messages transmitted on the communication bus 116. The sensors shown in FIG. 4 include, for example, an ambient or external temperature sensor 120, an ambient atmospheric pressure sensor 122, an engine speed sensor 124, a vehicle speed sensor 126, and an exhaust gas recirculation (EGR) flow sensor 128. In some instances, the listed sensors are similar to or the same as sensor sets used in an electronic stability control (ESC) system and/or a vehicle engine control system. In some arrangements the vehicle includes a diesel engine for a diesel powered vehicle.

In the FIG. 4 arrangement, in operation, the signals from an ambient or external temperature sensor 120, an ambient atmospheric pressure sensor 122, an engine speed sensor 124, a vehicle speed sensor 126, and an exhaust gas recirculation flow sensor 128 are retrieved by the electronic processor 44 of the electronic operating device 40 from a memory or storage device, for example, a memory outside of the vehicle. A wireless or wired connector provides the various signals thereto. The trained AI model 20 stored in memory 48 or elsewhere is executed by the electronic processor 44. The electronic processor 44 uses the ambient temperature signal, the ambient pressure signal, the engine speed signal, and the vehicle speed signal received from the vehicle system 90 to determine a predicted exhaust gas recirculation (EGR) flow signal, a tolerance band σ, and a valid model signal. When the model signal is valid, the value of the predicted exhaust gas recirculation flow signal is compared with the value of the measured and stored exhaust gas recirculation flow signal from the EGR flow sensor 128 as shown by the comparator 80 in FIG. 3. In another arrangement, the electronic processor 44 determines a comparison from input signals received. When the measured EGR flow signal is outside of the tolerance band σ, an anomaly is determined by the electronic processor 44. When the electronic processor 44 determines that there is an anomaly, the electronic processor 44 operates for storing the anomaly in the memory 48. In one arrangement, the comparator 80 provides anomalies to the aggregator 84. The aggregator 84 operates to count and store occurrences of anomalies. When a predetermined number of anomalies occur within a predetermined time, a warning is provided to a technician on a visual display and/or an audio speaker (not shown)

In another arrangement, the comparison device 80 and the aggregator 84 are integrated into the electronic processor 44 and the memory 48 shown in FIG. 2A, and are provided as an anomaly detection software algorithm and a vehicle component failure indication arrangement. The memory 48 store the anomalies and times for occurrence of the anomalies received from the vehicle. The electronic processor 44 operates to indicate failure of a vehicle component depending on a number of anomalies over a period of time. The vehicle component and type of failure can be indicated on visual display 58. In one arrangement, the vehicle component is an EGR system.

Figure 5:
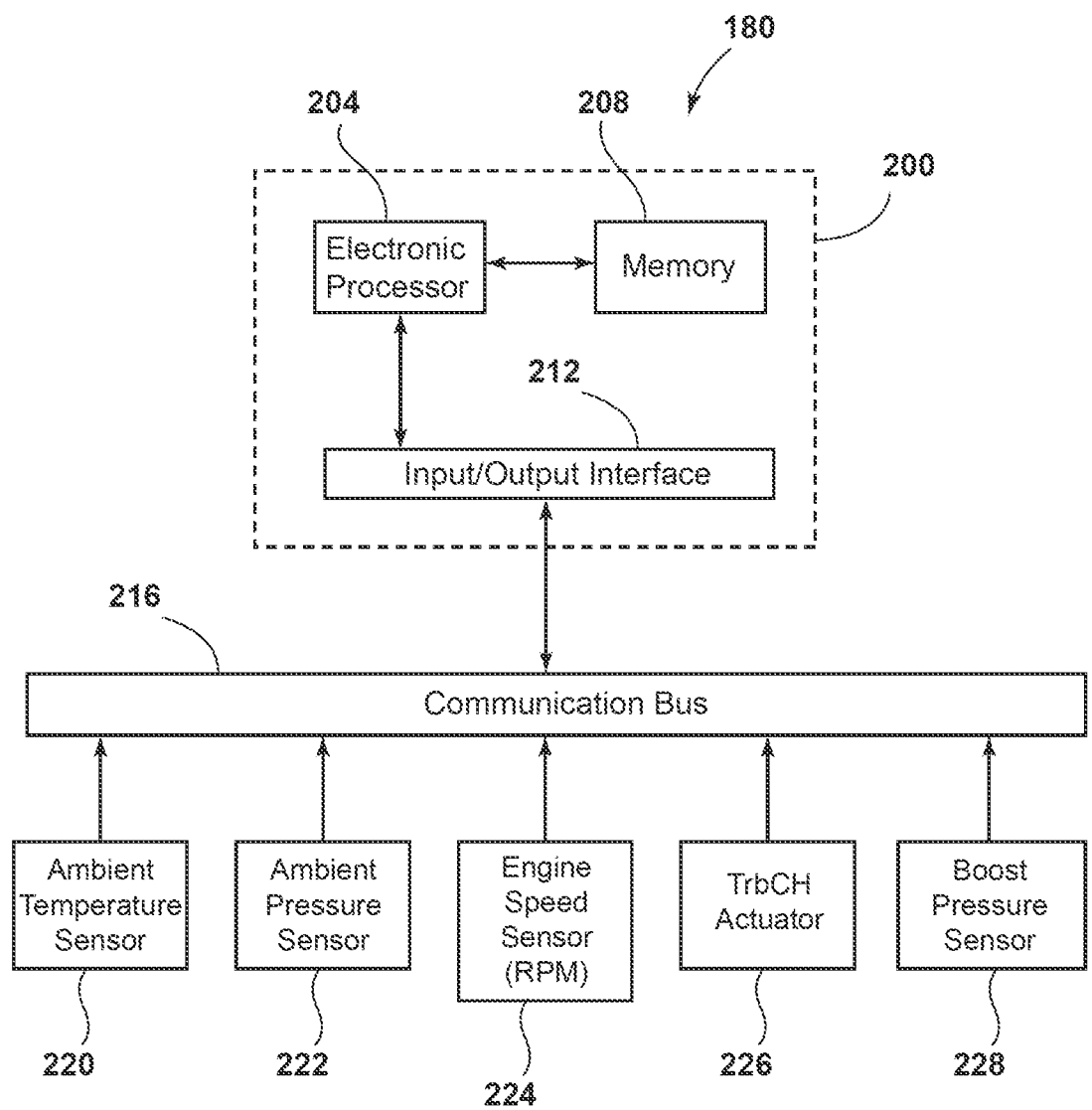
FIG. 5 is a block diagram of a vehicle electronic operating unit and sensors connected thereto via a bus to provide information related to boost pressure, according to some aspects.

FIG. 5 shows another specific example of a vehicle system 180 for storing and providing vehicle information including vehicle signals of a vehicle. The vehicle system 180 includes a vehicle electronic operating unit 200 that includes an electronic processor 204 (for example, a microprocessor, application specific integrated circuit, etc.), a memory 208, and an input/output interface 212. The memory 208 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 204 is coupled to the memory 208 and the input/output interface 212. The electronic processor 204 sends and receives information (for example, from the memory 208 and/or the input/output interface 212). The electronic processor 204 is also capable of storing and retrieving one or more software instructions or modules from the memory 208, or another non-transitory computer readable medium. The software can include firmware, one or more applications, program data, filters, rules, one or more program modules, and other executable instructions.

The electronic processor 44 shown in FIG. 2A is configured to retrieve from the memory 48 and execute, among other things, software including a trained AI algorithm for performing methods as described herein. The input/output interface 52 retrieves information originally from the vehicle electronic operating unit 200 external to the electronic operating unit 40. It should be understood that the electronic operating unit 200 may include additional components than those illustrated in FIG. 5 and in various configurations. For example, in some examples, the electronic operating unit 200 includes multiple electronic processors 204, multiple memories 208, multiple input/output interfaces 212, or a combination thereof.

In some instances, the communication bus 216 shown in FIG. 4 is a controller area network (CAN) bus. In some instances, the communication bus 216 is an automotive Ethernet, a FlexRay™ communications bus, or another suitable bus. In alternative instances, some or all of the components of the vehicle may be communicatively coupled using suitable wireless modalities (for example, Bluetooth™ or near field communication connections).

FIG. 5 shows sensors that measure one or more attributes of a vehicle/vehicle internal combustion engine and the environment around the vehicle and communicate information regarding those attributes to the other components of the vehicle using, for example, messages transmitted on the communication bus 216. The sensors shown in FIG. 5 include, for example, an ambient or environmental temperature sensor 220, an ambient atmospheric or environmental pressure sensor 222, an engine speed sensor 224, a Trb CH actuator sensor 226, and a boost pressure sensor 228. In some instances, the listed sensors are similar to or the same as sensor sets used in an electronic stability control (ESC) system and/or a vehicle engine control system. In some arrangements the internal combustion engine is for a gasoline or flex fuel powered vehicle.

In the FIG. 5 arrangement, in operation, signals from the ambient temperature sensor 220, the ambient pressure sensor 222, the engine speed sensor 224, and the Trb CH actuator sensor 226 are retrieved by the electronic processor 44 of the electronic operating device 40 from a memory or storage device, for example, a memory outside of the vehicle. A wireless or wired connector provides the signals thereto. The trained AI model 20 stored in memory 48 or elsewhere is executed by the electronic processor 44. The electronic processor 44 uses the ambient or environmental temperature signal, the ambient or environmental pressure signal, the engine speed signal, and the value of the actuator sensor signal Trb CH to determine a predicted boost pressure signal value, a tolerance band σ, and a valid model signal. When the model signal is valid, the value of the predicted boost pressure signal is compared with the actual value of the measured boost pressure signal from the boost pressure sensor 228. When the signal value is outside of the tolerance band σ, an anomaly is determined and stored in the memory 48. In one arrangement, the electronic processor 44 operates to count anomalies and when a predetermined number of anomalies occur within a predetermined time, a warning of boost pressure signal failure is stored for reading by a technician scanning the vehicle data.

In another arrangement, the comparison device 80 and the aggregator 84 are integrated into the electronic processor 44 and the memory 48, and are provided as an anomaly detection software algorithm executed by the electronic processor 44.

Figure 6:
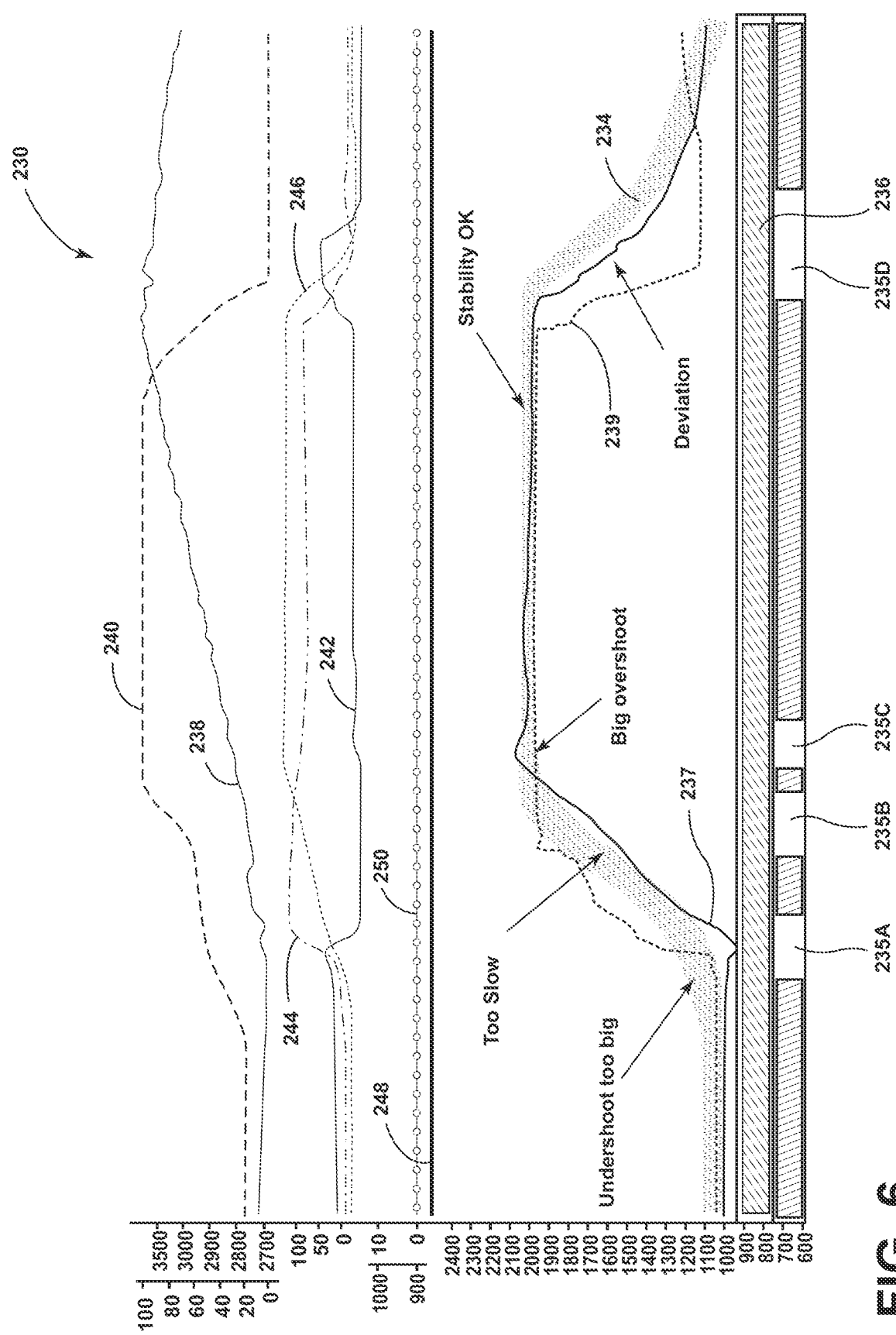
FIG. 6 is a graph corresponding to the boost pressure arrangement for the data obtained by the arrangement of FIG. 5, according to some aspects.

FIG. 6 illustrates a graph 230 directed to properties of the boost pressure signal arrangement shown in FIG. 5. The graph 230 includes properties of the outputs from the sensors and shows the tolerance band σ in shaded region 234. The bottom of FIG. 6 shows four different time periods 235A, 235B, 235C, 235D wherein the boost pressure value is not within the tolerance band σ. The amount of time that the measured boost pressure signal 237 is not within the tolerance band is stored in memory 208. In some arrangements, when the measured boost pressure signal 237 or value is not within the tolerance band for greater than a predetermined time period, a warning or boost pressure failure is stored. At the bottom of FIG. 6 the valid model signal 236 is shown as being valid for the entire time period that is shown. A boost pressure set point 239 is also shown in FIG. 6. The top of FIG. 6 shows engine speed 238 represented by revolutions per minute (rpm) in a range of 2700 rpm to 3500 rpm. The top of FIG. 6 also shows an accelerator pedal position 240 that is provided in a range from zero to 100% of accelerator pedal movement. FIG. 6 also shows the turbocharger actuator signal 242 corresponding to the scale from 0 to 100. Another throttle valve actuator signal 244 corresponds to the scale from 0 to 100. An engine load signal 246 is shown in FIG. 6. FIG. 6 also shows environmental temperature signal 248 in degrees Celsius shown as 0 to 10 degrees on the scale. Finally, FIG. 6 shows environmental pressure signal 250 over time corresponding to a 900 to 1000 hPa scale.

Figure 7:
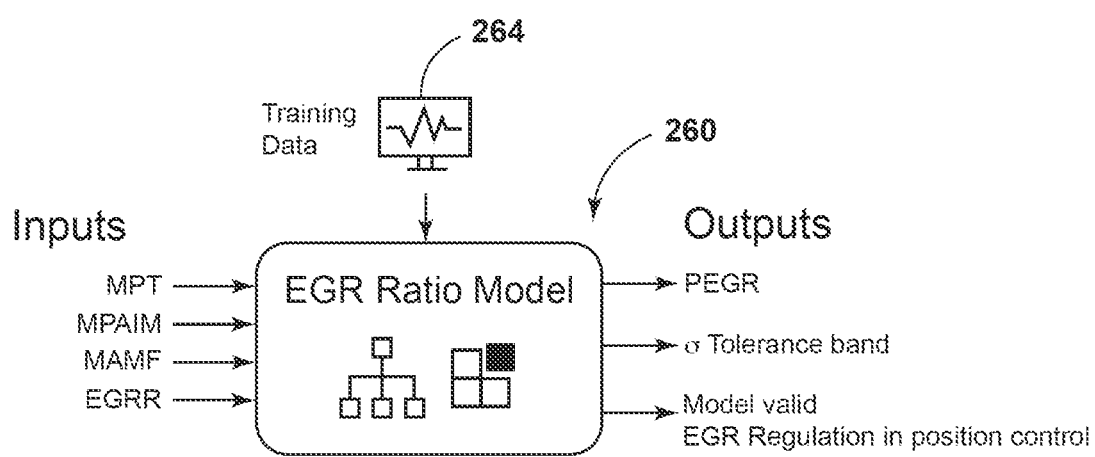
FIG. 7 is a block illustration of a model that receives inputs and training data to provide a predicted EGR rate signal, according to some aspects.

FIG. 7 illustrates a block illustration of a trained exhaust gas recirculation (EGR) ratio artificial intelligence (AI) model 260 that receives multiple vehicle inputs. The multiple vehicle inputs shown include: 1), which represents a modeled pressure at the inlet of a turbocharger turbine (MPT) corresponding to pressure upstream of an exhaust gas recirculation (EGR) valve, 2) a measured pressure in an air intake manifold (MPAIM) of the vehicle that is downstream of the exhaust gas recirculation (EGR) valve, 3) a model fresh air mass flow signal (MAMF) corresponding to a model air mass flow, and 4) a dynamically adapted requested EGR ratio (EGRR) corresponding to an exhaust gas recirculation (EGR) rate setpoint. The EGR artificial intelligence ratio model 260 operates to provide an estimated or predicted exhaust gas recirculation (PEGR) rate.

In training the exhaust gas recirculation (EGR) artificial intelligence ratio model 260 using a model training, as described above with respect to the model of FIG. 7. The model training occurs as follows. All available data is identified and an assessment of the relevance, and quality of the data is made. The data is separated between the training data 264 and testing datasets. An iterative model training occurs where model structure and hyperparameters are selected. The trained model quality is evaluated and validated based on relevant metrics. The iterative process results in many candidate models. Only one model is selected for use. Model selection is based on a quality/complexity tradeoff. Analysis of model performance with test data is performed. The selected model is integrated into the trained EGR artificial intelligence ratio model 260 and formatted as a digital file. The trained EGR artificial intelligence ratio model 260 is provided with or for use by an electronic operating device 40 as shown in FIG. 2A in one arrangement.

In operation, the trained EGR artificial intelligence ratio model 260 is configured to provide an output PEGR that corresponds to the estimated or predicted EGR rate for an EGR system. The trained EGR artificial intelligence ratio model 260 also determines a tolerance band value $\sigma$ from the plurality of input signals obtained and determines when the model is valid to generate a model valid signal. The predetermined or estimated EGR rate PEGR and the tolerance band also change over time, potentially along with the model valid signal.

Figure 8:
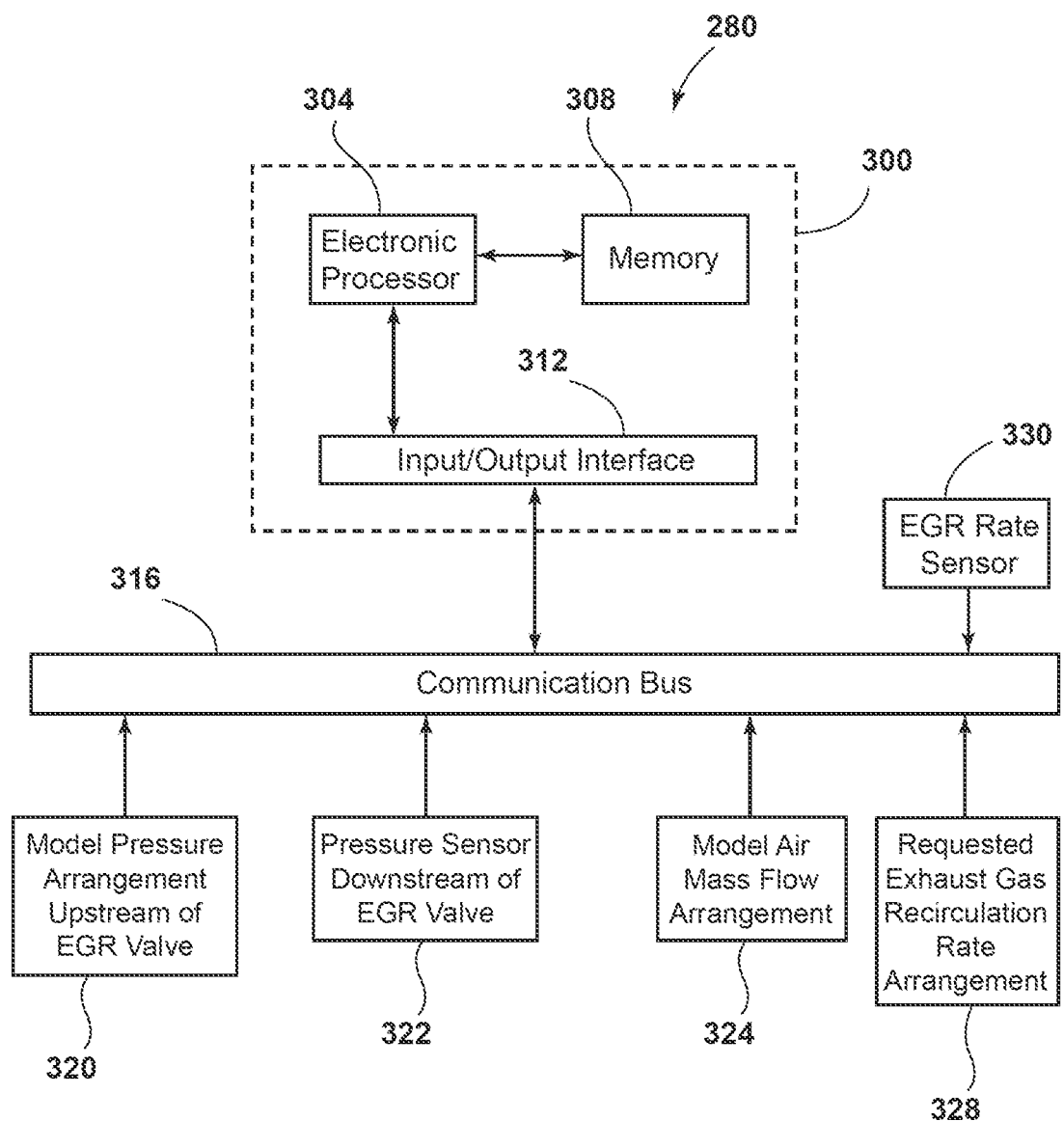
FIG. 8 is a block diagram of a vehicle electronic operating unit and sensors connected thereto via a bus to provide and store information related to EGR rate, according to some aspects.

FIG. 8 shows a specific example of a vehicle system 280 for storing and providing vehicle information including vehicle signals and modeled input signals. The vehicle system 280 includes an electronic operating unit 300 that includes an electronic processor 304 (for example, a microprocessor, application specific integrated circuit, etc.), a memory 308, and an input/output interface 312. The memory 308 may be made up of one or more non-transitory computer-readable media and includes at least a program storage area and a data storage area. The program storage area and the data storage area can include combinations of different types of memory, such as read-only memory ("ROM"), random access memory ("RAM"), electrically erasable programmable read-only memory ("EEPROM"), flash memory, or other suitable memory devices. The electronic processor 304 is coupled to the memory 308 and the input/output interface 312. The electronic processor 304 sends and receives or obtains information (for example, from the memory 308 and/or the input/output interface 312). The electronic processor 304 is also capable of storing and retrieving one or more software instructions or modules from the memory 44, or another non-transitory computer readable medium.

The input/output interface 312 transmits and receives information from the vehicle electronic operating unit 300 (for example, components of the vehicle via a communication bus 316). It should be understood that the vehicle electronic operating unit 300 may include additional components than those illustrated in FIG. 8 and in various configurations. For example, in some examples, the vehicle electronic operating unit 300 includes multiple electronic processors 304, multiple memories 308, multiple input/output interfaces 312, or a combination thereof.

In some instances, the communication bus 316 shown in FIG. 8 is a controller area network (CAN) bus. In some instances, the communication bus 316 is an automotive Ethernet, a FlexRay™ communications bus, or another suitable bus. In alternative instances, some or all of the components of the vehicle may be communicatively coupled using suitable wireless modalities (for example, Bluetooth™ or near field communication connections).

FIG. 8 shows arrangements and sensors that measure or determine one or more attributes useful for an exhaust gas recirculation (EGR) system of a vehicle/vehicle engine that includes an exhaust gas recirculation (EGR) circuit that controls an exhaust gas recirculation (EGR) valve, and an exhaust gas recirculation (EGR) bypass valve to provide exhaust gas recirculation (EGR) mass flow and fresh air mass flow that are mixed and output at an exhaust gas recirculation (EGR) rate. Sensors also sense the environment around the vehicle and communicate information regarding those attributes to the other components of the vehicle using, for example, messages transmitted on the communication bus 316. The arrangement shown in FIG. 8 includes, for example, a model pressure arrangement 320 for determining a model pressure signal MPAIM upstream of an exhaust gas recirculation (EGR) valve, a pressure sensor 322 for sensing a pressure signal downstream of the EGR valve, a fresh air mass flow arrangement 324 to determine a model air mass flow signal, and an exhaust gas recirculation rate arrangement 328 to obtain a requested exhaust gas recirculation rate EGRR. In some instances, the model signals provided by arrangements 320, 324, 328 are obtained by a separate trained AI model, different than the trained AI model 260, that is executed by an electronic processor or other device. In some instances, the vehicle exhaust gas recirculation (EGR) system is for a diesel powered vehicle. In other instances, the vehicle EGR system is contemplated for a gasoline engine. A EGR rate sensor 330 measures an exhaust gas recirculation rate.

In the FIG. 8 arrangement, in operation, stored signals from the model pressure arrangement 320 upstream of the EGR valve, the downstream pressure sensor 322, the fresh model air mass flow arrangement 324, and the requested EGR rate arrangement 328 are retrieved by the processor 44 of the electronic operating device 40 from a memory or storage device, for example, a memory outside of the vehicle in one example. The trained EGR AI ratio model 260 stored in memory 48 or elsewhere is executed by the electronic processor 44 of the electronic operating device 40. The electronic processor 44 uses the pressure sensor 320 sensing a pressure upstream of an EGR valve, the pressure sensor 322 sensing a pressure downstream of the EGR valve, and the fresh air mass flow sensor 324 sensing a fresh air mass air flow signal, and a dynamically adapted exhaust gas recirculation rate setpoint calculated from sensed values.

The model pressure arrangement 320 obtains a model pressure signal MPT for a turbine of a vehicle engine. The downstream pressure sensor 322 provides a pressure signal corresponding to an air intake manifold pressure MPAIM. The fresh model air mass flow arrangement 324 provides a model fresh air mass flow into a mixer of the EGR system to provide a model fresh air mass flow signal MAMF.

The retrieved signals corresponding to the model pressure arrangement 320, the pressure sensor 322 and the fresh model air mass flow signal from the fresh model air mass flow arrangement 324, along with the requested EGR rate setpoint EGRR are used by the electronic processor 44 executing the trained EGR AI ratio model 260 to determine an estimated or predicted exhaust gas recirculation rate PEGR, a tolerance band $\sigma$, and a valid model signal for the EGR system. In some aspects, other sensed values, such as ambient pressure, ambient temperature and other additional vehicle parameters are used by the electronic processor 44 executing the trained EGR AI ratio model 260 by executing an algorithm to obtain the predicted EGR rate PEGR.

Figure 9:
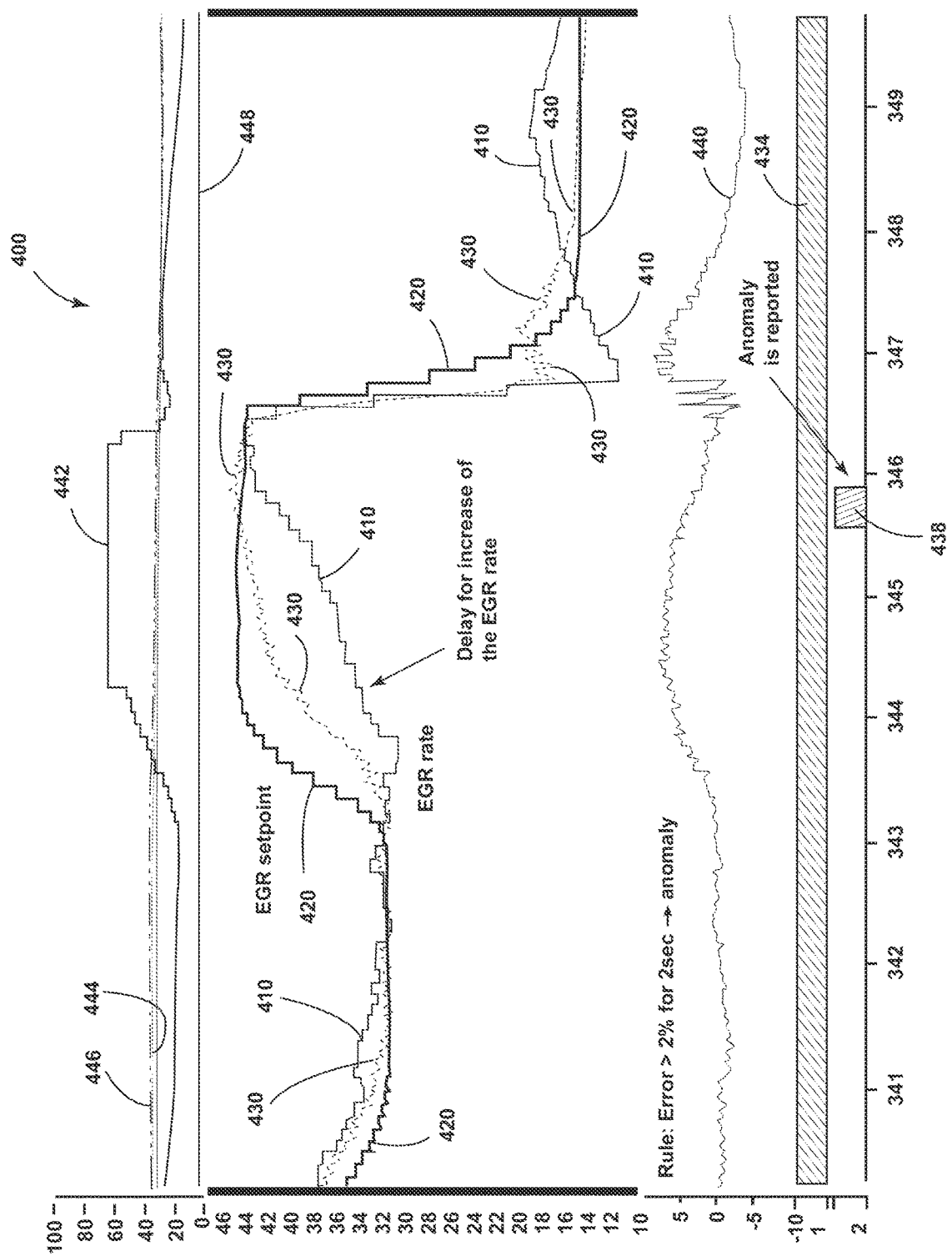
FIG. 9 is a graph corresponding to the EGR rate arrangement for the data obtained by the arrangement of FIG. 8, according to some aspects.

FIG. 9 shows a graph 400 of an example that displays the estimated or predicted EGR rate PEGR 410, a requested EGR setpoint EGRR 420, and a measured EGR rate 430 retrieved from a memory. In operation, the trained EGR AI ratio model 260 is not valid in certain instances, including when the EGR valve is closed, the EGR valve is ramping from an open loop, and when EGR system limits are reached. FIG. 9, however shows the model valid signal 434 as valid the entirety of the time period shown. An anomaly 438 only occurs for a small time period. FIG. 9 also shows an error model 440 for the arrangement. The top of FIG. 9 shows an EGR valve position signal 442 corresponding to a percentage that the valve is open. FIG. 9 also shows a measured pressure signal 444 in an air intake manifold wherein the 0-100 scale represents a 1000 hPa to 1500 hPa scale. Model pressure signal 446 at the inlet of a turbocharger corresponds to a 1000 hPa to 2000 hPa scale. FIG. 9 also shows model air mass flow signal 448, which corresponds to a 100 mg/hub to 500 mg/hub scale.

In operation, when the EGR AI ratio model 260 is valid, the predicted EGR rate is compared with the measured and stored EGR rate from the EGR rate sensor 330. When the measured EGR rate is outside of the tolerance band $\sigma$ (not shown in FIG. 9), an anomaly is determined by the electronic processor 44. When the electronic processor 44 determines that there is an anomaly, the electronic processor 44 operates for storing the anomaly in the memory 48. In one arrangement, the electronic processor 44 operates to count and store anomalies and when a predetermined number of anomalies occur within a predetermined time, a warning is provided to a technician analyzing the vehicle data.

In one arrangement, a comparison device similar to the comparison device 80 shown in FIG. 3 is integrated into the electronic processor 44 and the memory 48 shown in FIG. 2A, and is provided as an anomaly detection software algorithm. In another aspect, a physical comparison device performs the comparison in place of the electronic processor 44.

Figure 10:
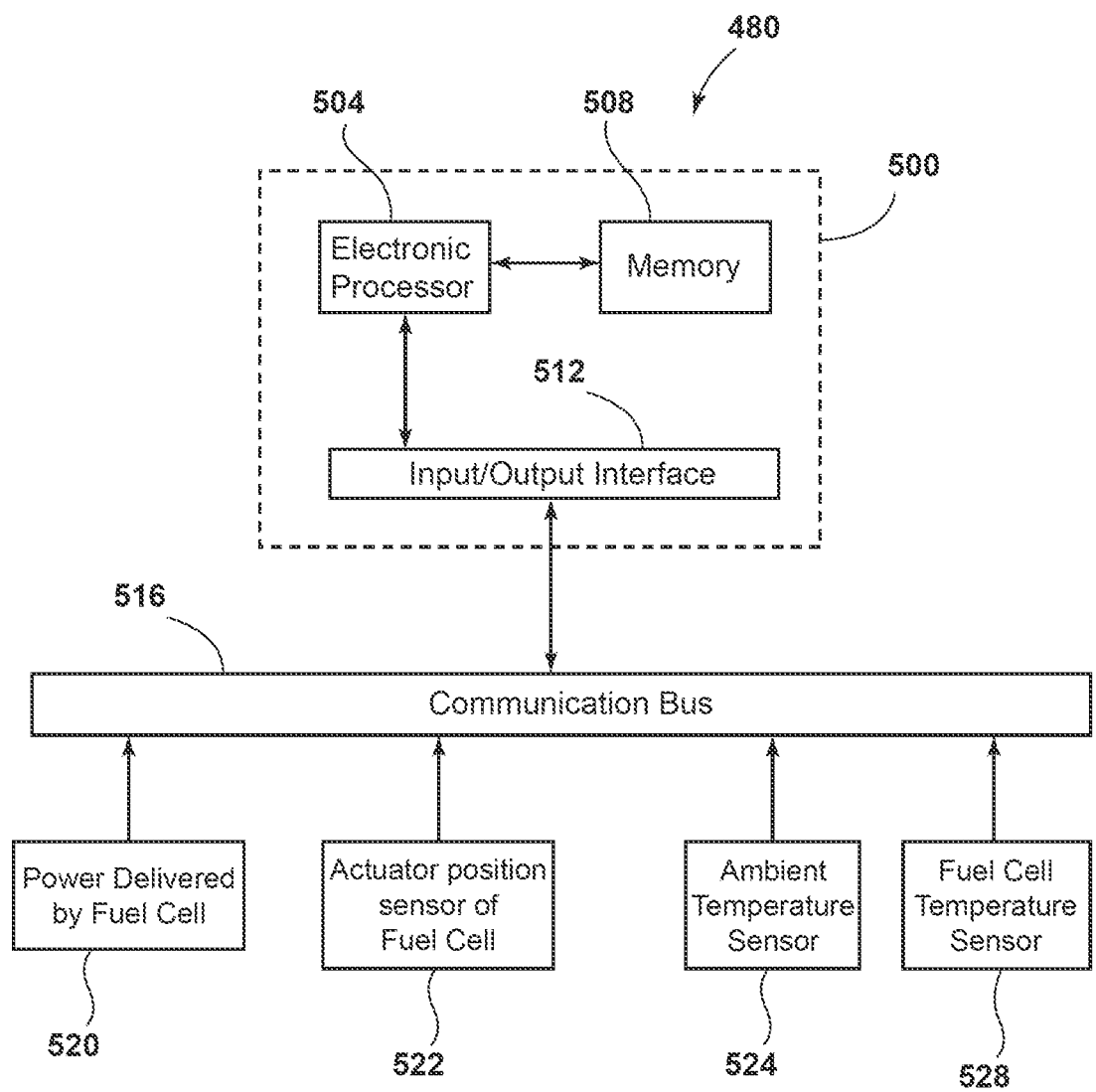
FIG. 10 is a block diagram of a vehicle electronic operating unit and sensors connected thereto via a bus to provide and store information related to a fuel cell of a fuel cell vehicle, according to some aspects.

Another vehicle system 480 shown in FIG. 10 is provided for obtaining and storing vehicle information including vehicle signals for a fuel cell thermal system of a fuel cell vehicle. The vehicle system 480 includes an electronic operating unit 500 that includes an electronic processor 504 (for example, a microprocessor, application specific integrated circuit, etc.), a memory 508, and an input/output interface 512. The electronic processor 504 is coupled to the memory 508 and the input/output interface 512. The electronic processor 504 sends and receives information (for example, from the memory 508 and/or the input/output interface 512) to the electronic operating device 40 for the trained AI model 20 via one or more software instructions or modules, capable of being stored in the memory 508, or another non-transitory computer readable medium.

FIG. 10 shows sensors that measure one or more attributes useful for an a fuel cell thermal system of a fuel cell vehicle. The sensors shown in FIG. 10 include, for example, a power sensor 520 for sensing power delivered by the fuel cell, an actuator position sensor 522 for sensing an actuator position signal for the fuel cell of the fuel cell vehicle, an ambient temperature sensor 524 for sensing an ambient temperature signal, and a fuel cell temperature sensor 528 for sensing a fuel cell temperature signal. The signals are stored in memory 508 or transmitted to a different memory not provided on the fuel cell vehicle.

In operation, signals from the power sensor 520, the actuator position sensor 522, and the ambient temperature sensor 524 over time, are retrieved by the processor 44 of the electronic operating device 40 from a memory or storage device, for example, a memory outside of the vehicle, in one example. The trained AI model 20 stored in memory 48 or elsewhere is executed by the electronic processor 44 to determine a predicted thermal/temperature fuel cell value for the fuel cell thermal system, a tolerance band $\sigma$, and a valid model signal based on the power signal from the fuel cell, the actuator position signal, and the ambient temperature signal. When the model signal is valid, the predicted fuel cell thermal/temperature signal is compared with the measured and stored fuel cell temperature signal from the fuel cell temperature sensor 528. When the compared value is outside of the tolerance band $\sigma$, an anomaly is determined and stored in the memory 48.

In an arrangement for a fuel cell vehicle, when the measured fuel cell temperature signal is not within the tolerance band for the predicted fuel cell temperature signal as shown by a number of detected anomalies, a fuel cell temperature sensor warning indication is provided on a visual display 58 of the electronic operating device 40. Besides, the above indications, the electronic operating device 40 is also able to determine sensor failure and other anomalies, such as engine performance anomalies and provide a visual display 58 of other warning indications.

In another arrangement, the fuel cell temperature sensor 528 is a first fuel cell temperature sensor and the vehicle includes a second fuel cell temperature sensor (not shown). When the vehicle component of the first fuel cell temperature sensor is indicated as a failure depending on a number of anomalies over a period of time, use of the first fuel cell temperature is discontinued by the electronic operating device 40 for the trained AI model 20. In one arrangement, the second fuel cell temperature sensor is enabled for a fuel cell vehicle when the first fuel cell temperature sensor 528 has anomalies.

While FIGS. 4, 5, 8 and 10 show certain types of sensors, additional sensors for assisting in the determination of a predicted vehicle signal are contemplated. Such sensors include ascent sensors, descent sensors, towed load sensors, and other types of sensors. Other sensors determine that a vehicle engine or fuel cell is cold or hot, plus environmental conditions, such as altitude and environmental temperature. In one arrangement, the fuel cell vehicle is a hydrogen fuel cell vehicle. Other arrangements are contemplated.

The artificial intelligence (AI) model 20 shown in FIG. 1 is capable of being trained in various computer environments by various microprocessors and computer arrangements. The training data and data sets, such as vehicle sensor data are stored in any type of memory or on a cloud based memory. After training is completed, the trained AI model can be loaded on a plurality of electronic operating devices 40 for use by a technician.

Besides determining the presence of anomalies, the electronic operating device 40 is configured to indicate defective components in a vehicle being scanned. For instance, in one arrangement, when the measured and stored exhaust gas recirculation signal is not within the tolerance band for the predicted EGR signal as shown by a number of detected anomalies, an indication of an EGR system failure is provided as an indication on a visual display of the electronic operating device 40.

In another arrangement, when the measured boost pressure signal is not within the tolerance band for the predicted boost pressure signal, as shown by detected anomalies, a boost pressure signal failure is provided by an indication on a visual display 58 of the electronic operating device 40. In another arrangement, the boost pressure sensor 228 is a first boost pressure sensor and the vehicle includes a second boost pressure sensor (not shown). When the vehicle component of the first boost pressure sensor 228 is indicated as a failure depending on a number of anomalies over a period of time, use of the first boost pressure sensor 228 is discontinued by the electronic operating device 40 for the trained AI model 20 sending a signal to the vehicle. In one arrangement, a second boost pressure sensor is enabled for use by an internal combustion vehicle.

Throughout the above text, sensor or model signals include a stored signal value and a stored time of occurrence of the measured/determined and stored signal value. Measured signals also include a stored signal value and time of occurrence. Thus, both signal values and a time stamp or time of occurrence are generally provided for all of the input vehicle signals and measured vehicle signals set forth above in some arrangements.

The above arrangements are used to provide various methods for determining anomalies. The correlated input signals depend on the type of vehicle signal of interest. While a plurality of sensors are listed in the specification and claims, the arrangements in FIGS. 4, 5, 8, and 10 are inclusive, and may also include additional sensors set forth herein that are not specifically disclosed in the arrangements.

In addition, unless the context of their usage unambiguously indicates otherwise, the articles "a" and "an" should not be interpreted as meaning "one" or "only one." Rather these articles should be interpreted as meaning "at least one" or "one or more."

Although certain arrangements, examples, features, and aspects have been described and illustrated, variations and modifications exist within the scope and spirit of the subject matter explained and shown.

What is claimed is:

1. A system for indicating a failure of a vehicle component by determining anomalies for a measured vehicle signal of a vehicle, the system comprising:
   a memory that stores a trained artificial intelligence model;
   an electronic processor coupled to the memory that executes the trained artificial intelligence model, wherein the electronic processor is configured to:
   retrieve a plurality of input signals that are correlated with the measured vehicle signal;
   determine a predicted vehicle signal from the plurality of input signals;
   determine a tolerance band from the plurality of input signals;
   determine whether the model is valid, and
   when the model is valid generate a model valid signal,
   a comparison device that is configured to:
   retrieve the predicted vehicle signal, the tolerance band, and the model valid signal,
   retrieve the measured vehicle signal, and
   determine whether the measured vehicle signal is an anomaly based on the measured vehicle signal, the predicted vehicle signal, the tolerance band, and the model valid signal, and
   an aggregator coupled to the comparison device, the aggregator configured to:
   count and store times and occurrences of the anomalies; and
   indicate a failure of the vehicle component depending on a number of the anomalies over a period of time.

2. The system of claim 1, wherein the predicted vehicle signal is a predicted exhaust gas recirculation flow signal and the measured vehicle signal is an exhaust gas recirculation flow signal.

3. The system of claim 2, wherein the plurality of input signals includes an ambient temperature signal, an ambient pressure signal, an engine speed signal, and a vehicle speed signal, and wherein the vehicle component is an exhaust gas recirculation flow sensor.

4. The system of claim 1, wherein the predicted vehicle signal is a boost pressure signal for an internal combustion engine and the measured vehicle signal is a measured boost pressure signal, and wherein the comparison device is configured to receive operating conditions of the vehicle.

5. The system of claim 4, wherein the plurality of input signals includes an environmental temperature signal, an environmental pressure signal, an engine speed signal, and an actuator sensor signal, and wherein the vehicle component is a boost pressure sensor.

6. The system of claim 1, wherein the predicted vehicle signal is a predicted fuel cell temperature signal and the measured vehicle signal is a measured fuel cell temperature signal, wherein the plurality of input signals include a power delivered by the fuel cell, an actuator position signal, an ambient temperature signal, and the measured fuel cell temperature signal, wherein the vehicle component is a fuel cell temperature sensor providing the measured fuel cell temperature signal, and wherein the vehicle is a fuel cell vehicle.

7. The system of claim 6, wherein the fuel cell temperature sensor is a first fuel cell temperature sensor and the fuel cell vehicle includes a second fuel cell temperature sensor, and wherein when the vehicle component of the first fuel cell temperature sensor is indicated as the failure depending on the number of anomalies over the period of time, use of the first fuel cell temperature sensor is discontinued, and the second fuel cell temperature sensor is enabled.

8. The system of claim 1, wherein the predicted vehicle signal is a predicted exhaust gas recirculation rate, and the plurality of input signals include a model pressure signal determined for upstream of an exhaust gas recirculation valve, a pressure signal downstream from the exhaust gas recirculation valve corresponding to an air intake manifold pressure, a model fresh air mass flow signal and a dynamically adapted exhaust gas recirculation rate setpoint.

9. A method for indicating failure of a vehicle component by determining anomalies for a measured vehicle signal of a vehicle, the method comprising:
   executing a trained artificial intelligence model with an electronic processor by:
   retrieving a plurality of input signals that are correlated with the measured vehicle signal;
   determining a predicted vehicle signal from the plurality of input signals;
   determining a tolerance band from the plurality of input signals;
   determining whether the model is valid,
   when the model is valid generating a model valid signal;
   retrieving the measured vehicle signal;
   determining whether the measured vehicle signal is an anomaly based on the measured vehicle signal, the predicted vehicle signal, the tolerance band, and the model valid signal;

counting a number of and storing times and occurrences of the anomalies; and indicating the failure of the vehicle component depending on the number of anomalies over a period of time.

10. The method of claim 9, wherein the predicted vehicle signal is a predicted exhaust gas recirculation flow signal and the measured vehicle signal is an exhaust gas recirculation flow signal, and wherein the vehicle component is an exhaust gas recirculation flow sensor.

11. The method of claim 10, wherein the plurality of input signals includes an ambient temperature signal, an ambient pressure signal, an engine speed signal, and a vehicle speed signal.

12. The method of claim 9, wherein the predicted vehicle signal is a boost pressure signal for an internal combustion engine, and wherein the plurality of input signals includes an environmental temperature signal, an environmental pressure signal, an engine speed signal, and an actuator sensor signal, and wherein the vehicle component is a boost pressure sensor.

13. The method of claim 9, wherein the predicted vehicle signal is a predicted exhaust gas recirculation rate, and the plurality of input signals include a model pressure signal determined for upstream of an exhaust gas recirculation valve, a pressure signal downstream from the exhaust gas recirculation valve corresponding to an air intake manifold pressure, a model fresh air mass flow signal and a dynamically adapted exhaust gas recirculation rate setpoint.

14. The method of claim 9, including a memory coupled to the electronic processor, the memory storing the trained artificial intelligence model.

15. The method of claim 9, wherein the predicted vehicle signal is a predicted fuel cell temperature signal and the measured vehicle signal is a measured fuel cell temperature signal, wherein the plurality of input signals include a power delivered by the fuel cell, an actuator position signal, and an ambient temperature signal, wherein the vehicle component is a fuel cell temperature sensor, and wherein the vehicle is a fuel cell vehicle.

16. The method of claim 15, wherein the fuel cell temperature sensor is a first fuel cell temperature sensor and the vehicle includes a second fuel cell temperature sensor, and wherein when the vehicle component of the first fuel cell temperature sensor is indicated as the failure depending on the number of anomalies over the period of time, a signal is provided to a vehicle system to discontinue use of the first fuel cell temperature sensor, and to enable use of the second fuel cell temperature sensor for the fuel cell vehicle.

17. A method for indicating failure of a vehicle component of a vehicle, the method comprising:

retrieving a plurality of input signals that are correlated with a vehicle signal;

determining a predicted vehicle signal from the plurality of input signals using a trained artificial intelligence model;

determining a tolerance band from the plurality of input signals;

determining whether the model is valid, when the model is valid generating a model valid signal;

retrieving a measured vehicle signal;

determining whether the measured vehicle signal is an anomaly based on the measured vehicle signal, the predicted vehicle signal, the tolerance band, and the model valid signal;

counting a number of and storing times for occurrence of the anomalies, and indicating the failure of a vehicle component depending on the number of anomalies over a period of time.

18. The method of claim 17, wherein the predicted vehicle signal is a predicted exhaust gas recirculation flow signal and the measured vehicle signal is an exhaust gas recirculation flow signal, and wherein the plurality of input signals includes an ambient temperature signal, an ambient pressure signal, an engine speed signal, and a vehicle speed signal.

19. The method of claim 17, wherein the predicted vehicle signal is a boost pressure signal for an internal combustion engine, and wherein the plurality of input signals includes an environmental temperature signal, an environmental pressure signal, an engine speed signal, and an actuator sensor signal.

20. The method of claim 17, wherein the predicted vehicle signal is a predicted fuel cell temperature signal and the measured vehicle signal is a measured fuel cell temperature signal, and wherein the plurality of input signals include a power delivered by a fuel cell, an actuator position signal, and an ambient temperature signal.

* * * * *